Nov. 27, 1951  W. G. MARTIN  2,576,468
WEIGHING SCALE FOR DETERMINING MASS DISTRIBUTIONS
Filed July 18, 1950  2 SHEETS—SHEET 1

Inventor
William G. Martin
By Willits, Helwig & Baillio
Attorneys

Nov. 27, 1951 W. G. MARTIN 2,576,468
WEIGHING SCALE FOR DETERMINING MASS DISTRIBUTIONS
Filed July 18, 1950 2 SHEETS—SHEET 2

Inventor
William G. Martin
By Willits, Helwig & Baillio
Attorneys

Patented Nov. 27, 1951

2,576,468

UNITED STATES PATENT OFFICE 2,576,468

WEIGHING SCALE FOR DETERMINING MASS DISTRIBUTIONS

William G. Martin, Flint, Mich., assignor to General Motors Corporation, Detroit, Mich., a corporation of Delaware Application July 18, 1950, Serial No. 174,451

7 Claims. (Cl. 73—65)

This invention relates to improved apparatus for simultaneously weighing both ends of an object, such as a connecting rod for an internal combustion engine, and indicating directly whether each end of the object is of the proper weight, and if not, the amount by which each end varies from the established standard weight.

An object of the present invention is to provide an improved device of the type described which is simple in construction and reliable in operation.

A further object of this invention is to provide an improved device of the type described which is arranged to require a minimum number of pivotal connections between the levers employed therein.

Another object of the invention is to provide an improved device of the type described which is arranged so that the weight which must be weighed by the weighing apparatus of the device is only a small portion of the total weight of the article being weighed.

Other objects of the invention and features of novelty will be apparent from the following description taken in connection with the accompanying drawings.

In practicing my invention I provide a first or main lever which is pivotally supported for movement about a first axis, and which has supported thereon another or second lever which is pivotal about a second axis spaced from and parallel to the first axis. The second lever has thereon a bracket adapted to hold a connecting rod to be weighed so that the ends of the rod are on opposite sides of the axis of the second lever. The first lever has a counterbalancing weight arranged to cause the first lever to occupy a horizontal position when there is supported on the second lever a connecting rod of standard total weight, while the second lever has secured thereto a counterbalancing weight arranged to cause the second lever to occupy a horizontal position when the weight of the connecting rod supported thereon is properly distributed between the two ends of the rod. The ends of the second lever have indicating means connected thereto in such manner that the total excess weight indicated by the two indicating means is determined by the amount of movement of the first lever, and so that the distribution of this excess weight between the two indicating means is determined by the amount of movement of the second lever relative to the first lever.

In the drawings

Figure 1:
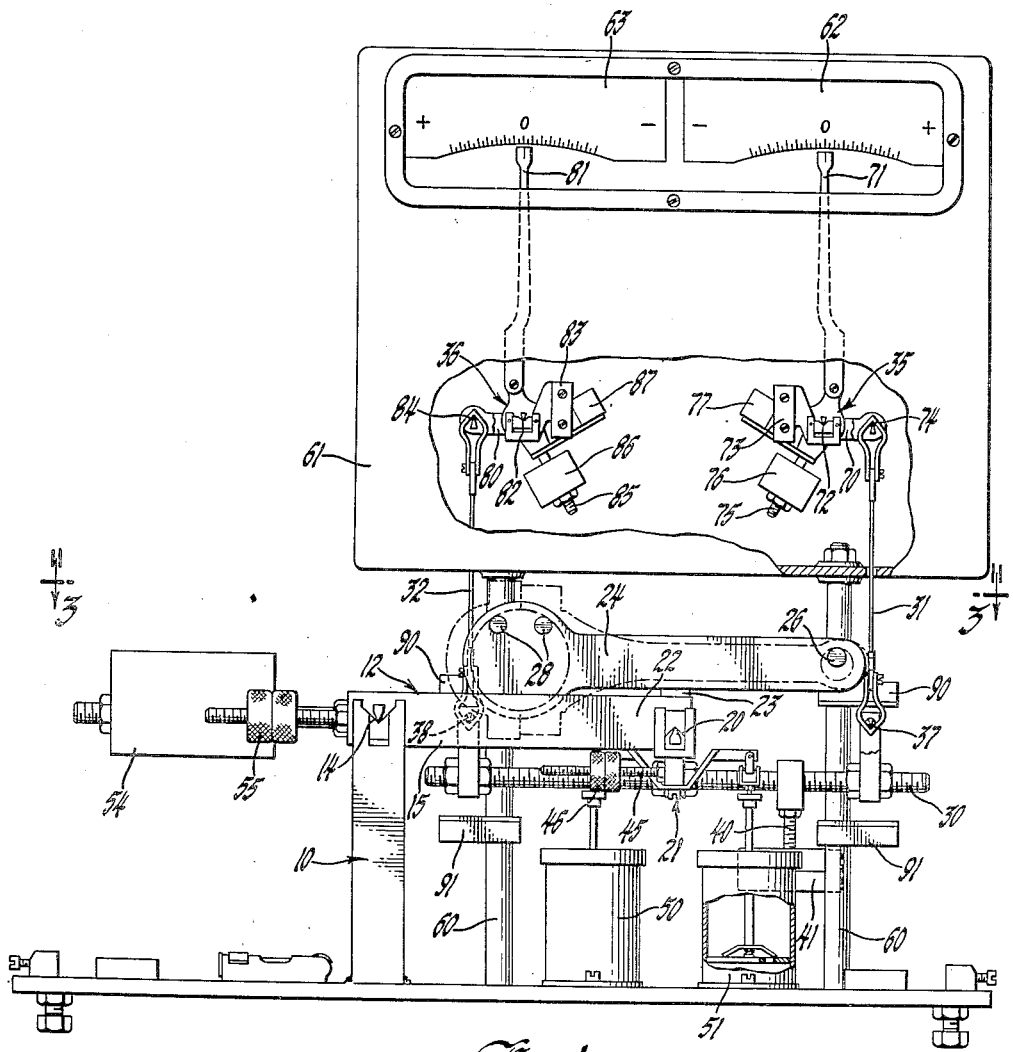
Fig. 1 is a front elevational view of a weighing scale embodying my invention with portions broken away to more clearly disclose other portions.
Figure 2:
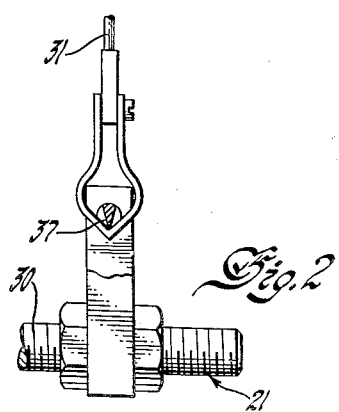
Fig. 2 is a fragmentary enlarged view of one of the knife edge bearing units employed in this scale.

Referring to the drawings there is shown therein a weighing scale constructed in accordance with this invention. This scale comprises a frame indicated generally by the reference numeral 10 and constructed of suitable material to provide a substantially rigid foundation on which the movable elements of the scale are mounted.

The scale has a first or main lever 12 which is supported from the frame 10 by means of knife edge bearing elements 14 so as to be pivotal about a first axis. The lever 12 has spaced parallel arms 15 which are rigidly connected together at one end by the cross member 16 which is located substantially in alignment with the bearing elements 14. The ends of the arms 15 remote from the bearing elements 14 have secured thereon portions of the knife edge bearing elements 20 on which are supported the second lever which is indicated generally by the reference numeral 21. The second lever 21 is pivotal on the knife edge bearing elements 20 with the result that the second lever is pivoted on a second axis which is offset or spaced from the axis of the first lever, while the axis of the second lever is substantially parallel to the axis of the first lever.

The second lever 21 comprises a member 22 extending transversely of the arms 15 of the first or main lever 12 and having secured on the ends thereof portions of the knife edge bearing elements 20. The transverse member 22 has formed integral therewith a substantially vertical upwardly extending member 23 which is located intermediate the ends of the member 22 and which extends upwardly between the arms 15 of the first or main lever 12.

Figure 3:
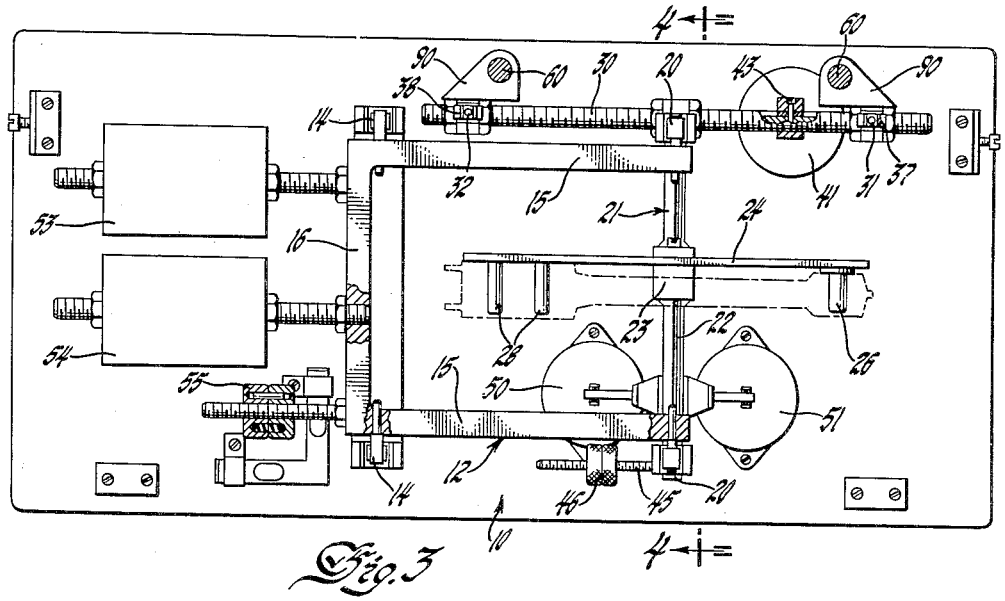
Fig. 3 is a sectional view taken substantially along the line 3—3 on Fig. 1 with parts broken away and shown in section.
Figure 4:
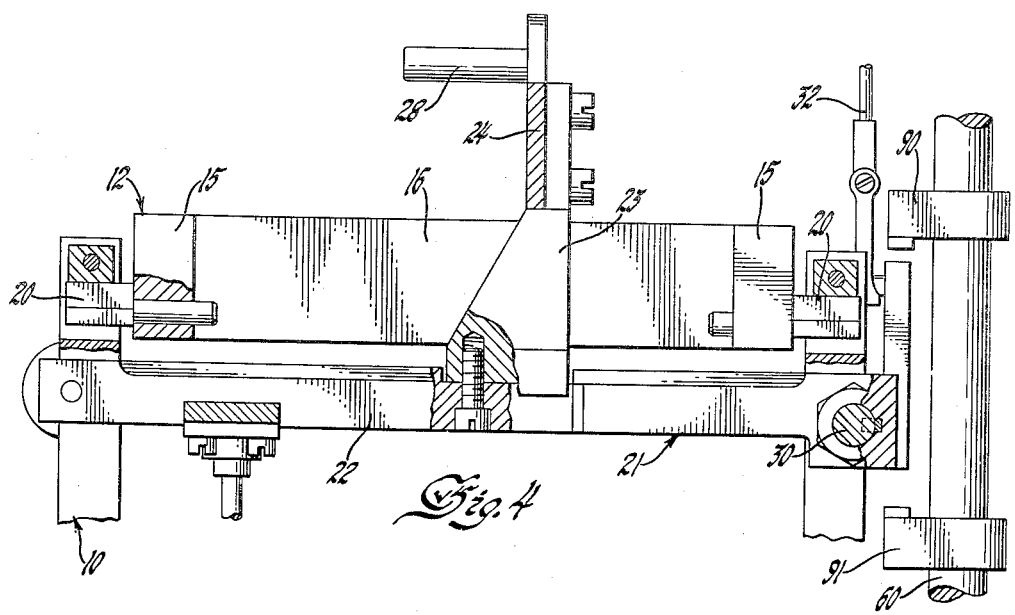
Fig. 4 is a sectional view taken substantially along the line 4—4 on Fig. 3 with parts broken away and shown in section.

The upper end of the member 22 has secured thereto a bracket 24 which extends in a substantially horizontal plane and is substantially parallel to the arms 15 of the first or main lever 12. The bracket 24 extends on opposite sides of the axis of the second lever 21 and has projecting from the face thereof a pin 26 located near one end of the bracket, and a pair of spaced pins 28 located near the other end of the bracket. The pin 26 is adapted to receive the small or piston pin end of a connecting rod to be weighed, while the pins 28 are adapted to receive the large or crankshaft end of the connecting rod to be weighed. The pins 26 and 28 are arranged so that when a connecting rod is supported thereon, the ends of the rod will be located on opposite sides of the axis of the second lever, and so that the centers of the piston pin and crankshaft holes of the rod are substantially equidistant from the vertical plane of the axis of the second lever. In addition, the pins 26 and 28 are arranged so that when a connecting rod to be weighed is supported on the bracket 24, bosses or projections on the ends of the rod and from which material may be removed to correct the weight of the rod, are substantially in alignment with the links of the balancing pendulums hereinafter described. The position of a connecting rod when supported on the pins 26 and 28 is indicated by broken lines in Figs. 1 and 3 of the drawings.

The second lever 21 includes the threaded rod 30 which extends substantially at right angles to the transverse member 22 and is rigidly secured to the member 22. The second lever 21 has secured thereto through connection to the ends of the rod 30, the lower ends of the links 31 and 32 which operate the counterbalancing pendulums and balance indicating mechanisms which are indicated generally by the reference numerals 35 and 36. The links 31 and 32 are pivotally connected with the rod 30 through knife edge joints 37 and 38, respectively, which are arranged so that the axis of each of these joints is in substantially the same horizontal plane as the axis of the first and second levers when the first and second levers are substantially horizontal.

The rod 30 has secured thereon a substantially rigid downwardly extending threaded member 40 on which there is adjustably secured a first balancing weight 41. The member 40 is secured on the rod 30 at a point spaced from the axis of the second lever 21 and located on the side of this axis opposite from the side on which is located the end of the bracket 24 which is adapted to receive the large or crankshaft end of a connecting rod. The member 40 is adjustably secured on the rod 30 so as to be movable thereon towards or away from the axis of the second lever 21, while the member 40 is held in the adjusted position by a lock screw 43. Similarly, the weight 41 is movable vertically on the member 40 and is held in the adjusted position by suitable means not shown.

The various parts of the equipment are arranged and proportioned so that when a connecting rod of standard total weight and weight distribution is in position on the bracket 24, the weight 41 will exert on the second lever 21 force sufficient to substantially equalize the forces exerted on the portions of the lever on opposite sides of the axis of the lever.

The lever 21 also has associated therewith a threaded rod 45 which extends at right angles to the axis of the lever 21 and is located slightly below the horizontal plane of the axis of the second lever 21. The rod 45 has adjustably secured thereon a relatively small weight 46 which is movable on the rod 45 towards or away from the axis of the lever 21 to provide small adjustments to equalize the forces exerted on the portions of the lever 21 on opposite sides of the axis of the lever.

The second lever 21 has pivotally secured thereto at a point on one side of the axis of the lever, the stem of the piston of a dash pot assembly indicated generally at 50, while the second lever 21 has pivotally secured thereto at a point on the other side of the axis of the lever, the stem of the piston of another dash pot assembly indicated generally at 51. The dash pot assemblies operate in the usual manner to stabilize the lever 21, and thereby also stabilize the lever 12.

The first or main lever 12 has attached thereto the relatively large weights 53 and 54 and one relatively small weight 55, these weights being secured to the lever 12 in such manner that the weights are located on the side of the axis of the lever 12 opposite from that on which the axis of the second lever 21 is located. The weights 53, 54 and 55 are mounted on threaded rods which extend in a substantially horizontal plane, the weights being movable on these rods towards or away from the axis of the first lever and being secured in the adjusted position by suitable locking means. The weights 53, 54 and 55 are of such size and of such location relative to the axis of the first or main lever 12 as to substantially equalize the forces exerted on the portions of the first or main lever 12 on opposite sides of the axis of the lever when there is mounted on the bracket 24 a connecting rod of standard weight. In addition, the weights 53, 54 and 55 are secured to the lever 12 in such manner that when the lever 12 is in a substantially horizontal position, the center of gravity of the weights 53, 54 and 55 is vertically below the axis about which the lever 12 pivots. The weights 53 and 54 are in the form of cylinders with eccentrically located holes extending therethrough so that each of these weights may be turned on the rod on which it is mounted to thereby vary the vertical location of the center of gravity of these weights.

The frame 10 includes a pair of spaced vertical rods 60 on the upper ends of which there is secured a housing 61 in the form of a shallow metal pan which is open on the side towards the rear of the scale. The wall of the housing 61 has an opening therein in which are secured scales 62 and 63 on which there are suitable graduations and which cooperate with the pointers of the counter-balancing pendulums and balance indicating mechanisms 35 and 36. The graduations on the left hand side of the zero indication on the scale 62 indicate selected fractions of an ounce underweight, while those on the right hand side of this scale indicate similar fractions of an ounce overweight. Likewise, the graduations on the left hand side of the zero indication on the scale 63 indicate selected fractions of an ounce overweight, while those on the left hand side of this scale indicate underweight.

The mechanisms 35 and 36 are similar in construction and operation. The mechanism 35 comprises a lever 70 having a plurality of arms, one of which is the pointer 71 which cooperates with the scale 62 to indicate deviations of the weight of the small or piston pin end of a connecting rod from the standard weight. The lever 70 is pivotally supported by knife edge bearings 72 on a bracket 73 secured on the rear face of the housing 61 so that the lever is supported on the scale frame 10. The lever 70 has a substantially horizontally extending arm to which the upper end of the link 31 is connected by means of a knife edge bearing 74, the various parts of the scale being arranged and proportioned so that the axes of the knife edge bearings 72 and 74 are in substantially the same horizontal plane when the first lever 12 and the second lever 21 are substantially horizontal. In addition, the various parts of the equipment are arranged and proportioned so that under the conditions stated, the pointer 71 points to the zero marking on the scale 62. The lever 70 has an arm 75 which extends downwardly at an angle from the vertical and has secured thereon the weights 76 and 77 which are located so that they exert force tending to move the lever 70 in the counterclockwise direction, as viewed in Fig. 1 of the drawings. Hence, the weights 76 and 77 maintain the joints 37 and 74 at the ends of the link 31 under tension, and exert force on the second lever 21 tending to move the lever 21 in the counterclockwise direction.

The mechanism 36 comprises a lever 80 having a plurality of arms, one of which is the pointer 81 which cooperates with the scale 63 to indicate deviations of the weight of the large or crankshaft end of a connecting rod from the standard weight. The lever 80 is pivotally supported by knife edge bearings 82 on a bracket 83 secured on the rear face of the housing 61 so that the lever is supported on the scale frame 10. The lever 80 has a substantially horizontally extending arm to which the upper end of the link 32 is connected by means of a knife edge bearing 84, the various parts of the scale being arranged and proportioned so that the axes of the knife edge bearings 82 and 84 are in substantially the same horizontal plane when the first lever 12 and the second lever 21 are substantially horizontal. In addition, the various parts of the equipment are arranged and proportioned so that under the conditions stated, the pointer 81 points to the zero marking on the scale 63. The lever 80 has an arm 85 which extends downwardly at an angle from the vertical and has secured thereon the weights 86 and 87 which are located so that they exert force tending to move the lever 80 in the clockwise direction, as viewed in Fig. 1 of the drawings. Hence, the weights 86 and 87 maintain the joints 38 and 84 at the ends of the link 32 under tension, and exert force on the second lever 21 tending to move the lever 21 in the clockwise direction, that is in the direction opposite to that in which the lever 21 tends to be moved by force exerted by the weights 76 and 77 associated with the lever 70.

The various parts of the equipment are arranged so that when the first and second levers are substantially horizontal, at which time the pointers 71 and 81 both point to the zero indications, the force exerted on the second lever 21 by the weights associated with the levers 70 and 80 are substantially equal in magnitude, and since these forces tend to move the lever 21 in opposite directions, these forces substantially cancel each other and therefore do not directly affect the position occupied by the lever 21.

Although the forces exerted by the counterbalancing pendulums and balance indicating mechanisms 35 and 36 substantially cancel each other with respect to the second lever 21, these forces are cumulative or additive with respect to the first or main lever 12 so that the sum of the forces exerted by these mechanisms is exerted on the main lever and reduces the force required to be exerted by the weights 53, 54 and 55. The forces exerted by the counterbalancing pendulums and balance indicating mechanisms 35 and 36 reduce the force which would otherwise be transmitted to the first lever because of the weight of the second lever and of a connecting rod supported thereon.

The various parts of the apparatus are arranged and proportioned so that the force exerted by each of the counterbalancing pendulums and balance indicating mechanisms on the first and second levers is somewhat greater than the total amount of weight deviation to be measured by the mechanism, but so that the sum of the forces exerted by these mechanisms is only a small portion of the force which would be transmitted through these mechanisms if the force represented by the entire weight of a connecting rod were transmitted through these mechanisms.

As pointed out above the counterbalancing pendulums and balance indicating mechanisms are arranged so that when the pointers of both of these mechanisms point to the zero indications on the associated scales, the mechanisms exert equal but opposite forces on the second lever 21. Each of these mechanisms is also arranged so that on movement of the pointer thereof across the associated scale, the mechanism exerts on the second lever force which varies in magnitude in accordance with the amount and direction of movement of the pointer away from the zero position.

Each of the mechanisms is responsive to force exerted thereon by an end of the second lever, and this force exerted by an end of the second lever is determined by the weight of the end of the connecting rod associated with that end of the second lever. Accordingly, when a connecting rod is supported on the second lever, the pointer of each of the mechanisms moves to the position in which the force exerted by the mechanism on the end of the second lever is substantially equal to the force exerted by the lever end on the mechanism, the pointer of the mechanism moving to one side of the zero indication if the weight of the connecting rod end is less than standard, and moving to the other side of the zero indication if the weight of the connecting rod end is more than standard.

In operation the various weights are adjusted so that when a connecting rod of standard total weight and proper weight distribution is mounted on the bracket 24, the pointers 71 and 81 of the counterbalancing pendulums and balance indicating mechanisms 35 and 36 point to the zero markings on the associated scales, and so that the first and second levers both extend in substantially horizontal planes.

When the connecting rod is removed from the bracket 24, the weight on the portion of the first or main lever 12 on the right hand side of the lever axis, as viewed in Fig. 1 of the drawings, is reduced with the result that the lever 12 is moved in a counterclockwise direction by the lever weights. Similarly, when the connecting rod is removed from the bracket 24, the weight on the portion of the second lever 21 on the left hand side of the lever axis, as viewed in Fig. 1 of the drawings, is reduced more than the weight on the portion of the lever on the other side of the lever axis with the result that the lever 21 tends to be moved in a clockwise direction by the weight 41. Upward movement of the ends of the lever 21 is limited by engagement of portions of the lever with stops 90 secured on the rods 60, while downward movement of the ends of the lever 21 is limited by engagement of portions of the lever with other stops 91 secured on the rods 60.

When a connecting rod to be weighed is placed on the bracket 24, the weight of the connecting rod causes the first lever 12 to move in a clockwise direction about the lever axis to a position adjacent the position occupied by the lever when the lever is extending in a horizontal plane. In addition, when the connecting rod is placed on the bracket 24, the large or crankshaft end of the rod increases the weight on the left hand side of the axis of the lever 21 more than the weight on the other side of the lever axis is increased so that the lever 21 moves in a counterclockwise direction about its axis. Accordingly, at this time the lever 21 as a whole moves down because of movement of the lever 12 on which the lever 21 is supported, while the lever 21 pivots about its axis, thereby raising one end and lowering the other end, so that the positions of the ends of the secondary lever is determined in part by the total weight of the connecting rod, which affects the amount of downward movement of the end of the first or main lever 12 on which the second lever 21 is supported, and in part by the distribution of the rod weight between the ends of the rod, which affects the amount of turning of the second lever 21 on the first or main lever 12.

As previously explained, the weights 53, 54 and 55 secured to the first or main lever 12 substantially equalize the forces on the portions of the lever 12 on opposite sides of the lever axis when there is supported on the lever a connecting rod of standard total weight. These weights counterbalance the weight of the lever 12, the lever 21 supported thereon, and the major portion of the weight of a connecting rod, the remainder of the weight of the rod being balanced by the counterbalancing pendulums and balance indicating mechanisms 35 and 36.

The rate of change of the effective length of the arm through which the weights 53, 54 and 55 exert force on the lever 12 is affected by the distance of the center of gravity of these weights below the axis of the lever 12, and this distance may be adjustably varied by turning the weights 53 and 54 on the rods on which they are mounted. This provides means to adjustably vary the range of movement of the lever 12 in response to weights imposed on the lever so that the amount of movement of the lever 12 can be adjusted to provide the amount of movement necessary to cause proper operation of the pointers of the counterbalancing pendulums and balance indicating mechanisms.

In addition, as explained in detail above, the balancing pendulum and balance indicating mechanisms exert variable forces on the ends of the second lever 21. Accordingly, each end of the second lever 21, and each of the balance indicating mechanisms, moves to the position in which the force exerted on an end of the second lever 21 because of the weight of the connecting rod supported thereon balances the force exerted on the lever end by the associated balance indicating mechanism. As a result of this movement of each of the balance indicating mechanisms, the pointer of the mechanism is moved to a position on the associated scale to indicate the amount by which an end of the connecting rod deviates from the standard weight.

For purposes of illustration it will be assumed that the rod being weighed is of greater total weight than a standard rod and that this excess weight is distributed between the two ends of the rod.

As the rod is assumed to be overweight, the end of the first or main lever 12 supporting the second lever 21 moves to a position below the position normally occupied by this end of the lever 12, thereby causing the second lever 21 as a whole to occupy a position below that which the lever would occupy when supporting a connecting rod of standard total weight. This downward movement of the lever 21 as a whole causes force to be exerted through the links 31 and 32 to move the pointers 71 and 81 of the balance indicating mechanisms 35 and 36 across the associated scales to indicate excess weight.

As a result of this movement of the balance indicating mechanisms, each of these mechanisms exerts on the associated end of the second lever somewhat greater force than is exerted on the lever end by the mechanism when the lever end is in the position which it occupies when supporting a connecting rod end of standard weight. Since it is assumed that both ends of the rod being weighed are overweight, it follows that both balance indicating mechanisms exert somewhat greater force on the lever 21 than they exert on the lever when the lever is supporting a connecting rod of standard weight. The sum of the increased force exerted by the two balance indicating mechanisms equals the total excess force exerted by the connecting rod being weighed because of the greater than standard weight of this rod. Hence, the end of the first lever 12 which supports the second lever 21 moves downward until the opposing force exerted by the balance indicating mechanisms increases sufficiently to offset the force exerted by the connecting rod being weighed, while the lever 21 pivots on its axis to cause the force exerted by the rod being weighed to be distributed between the ends of the second lever in accordance with the distribution of excess weight between the two ends of the rod.

If the connecting rod being weighed is overweight, but has all of the excess weight concentrated on one end, the first lever will move to a position below that occupied by the lever when weighing a connecting rod of standard weight. At the same time, because of the presence of excess weight on one end of the rod, the second lever tilts on its axis, thereby causing the lever end supporting the end of the connecting rod with the excess weight to move to a lower position, while the other end of the second lever moves to a higher position and causes the associated indicating mechanism to indicate no excess weight.

It will be seen therefore that the operation of the scale is such that movement of the first or main lever measures the total amount of excess weight of the connecting rod being weighed, while movement of the second lever relative to the first lever measures the distribution of the excess between the two ends of the rod. The scale therefore provides means to quickly and accurately determine if a connecting rod is of the proper weight and weight distribution, and to show how much weight should be removed from each end of the rod to cause the rod to be of the proper weight and weight distribution.

In addition, it will be seen that the scale is arranged so that the major portion of the weight of the connecting rod being weighed, as well as the weight of the rod holding means, is supported independently of the balancing pendulums and balance indicating mechanisms. Hence, these mechanisms may be made relatively light and sensitive so that the scale will accurately indicate small weight variations.

Although I have illustrated and described one form of weighing scale embodying my invention, it is to be understood that the invention is not limited to these details of construction and that numerous changes and modifications may be made therein without departing from the spirit and scope of the following claims.

I claim:

1. In a device of the class described, a main lever pivotally supported for movement about a first axis, a second lever pivotally supported intermediate its ends on said main lever for movement about a second axis spaced from and extending substantially parallel to said first axis, means on said second lever for supporting an article to be weighed in a substantially predetermined position relative to said second axis and with the ends of said article on horizontally opposite sides of said second axis, and a force counterbalancing pendulum and balance indicating means connected to each end of said second lever.

2. In a device of the class described, a main lever pivotally supported for movement about a first axis, a second lever pivotally supported intermediate its ends on said main lever for movement about a second axis spaced from and extending substantially parallel to said first axis, means on said second lever for supporting an article to be weighed in a substantially predetermined position relative to said second axis and with the ends of said article on horizontally opposite sides of said second axis, a first force counterbalancing pendulum and balance indicating means connected to one end of said second lever, and a second force counterbalancing pendulum and balance indicating means connected to the other end of said second lever.

3. In a device of the class described, a first lever pivotally supported on a frame for movement about a first axis, a second lever pivotally supported intermediate its ends on said first lever for movement about a second axis at the first side of and substantially parallel to said first axis, means on said second lever for supporting an article to be weighed in a substantially predetermined position with the ends of said article on horizontally opposite sides of said second axis, a first force counterbalancing pendulum and balance indicating means pivotally supported on said frame for movement about a third axis substantially parallel to said first axis, a second balance indicating means pivotally supported on said frame for movement about a fourth axis substantially parallel to said first axis, said first force counterbalancing pendulum and balance indicating means being operatively connected to one end of said second lever, said second force counterbalancing pendulum and balance indicating means being connected to the other end of said second lever, and a counterweight attached to said first lever on the second side of said first axis, said counterweight being of such size and location that it substantially offsets the weight of the portion of said first lever on the first side of said axis together with the weight of said second lever and at least a substantial portion of the weight of an article of standard displacement.

4. In a device of the class described, a first lever pivotally supported on a frame for movement about a first axis, a second lever pivotally supported intermediate its ends on said first lever for movement about a second axis at the first side of and substantially parallel to said first axis, means on said second lever for supporting an article to be weighed in a substantially predetermined position with the ends of said article on horizontally opposite sides of said second axis, a first balancing pendulum and balance indicating mechanism connected to one end of said second lever, a second balancing pendulum and balance indicating mechanism connected to the other end of said second lever, each of said mechanisms including means which provides a zero indication when the associated end of the second lever is in a normal position and which provides indications of overweight or underweight according as the associated end of the second lever is below or above said normal position, each of said mechanisms exerting on the associated end of said second lever upwardly directed force which varies in magnitude in accordance with downward movement of the associated end of said second lever, said mechanisms being arranged so that the upwardly directed force exerted thereby on the second lever is substantially less than the downwardly directed force exerted on the second lever by an article being weighed, and a counterweight attached to said first lever on the second side of said first axis, said counterweight being of such size and location that it substantially offsets the weight of the portion of said first lever on the first side of said axis together with the weight of said second lever and the portion of the force exerted on the second lever by an article being weighed in excess of the force exerted on said second lever by said balancing pendulums and balance indicating mechanisms.

5. In a device of the class described, a first lever pivotally supported on a frame for movement about a first axis, a second lever pivotally supported intermediate its ends on said first lever for movement about a second axis at the first side of and substantially parallel to said first axis, means on said second lever for supporting an article to be weighed in a substantially predetermined position with the ends of said article on horizontally opposite sides of said second axis, a first balancing pendulum and balance indicating mechanism connected to one end of said second lever, a second balancing pendulum and balance indicating mechanism connected to the other end of said second lever, each of said mechanisms including means which provides a zero indication when the associated end of the second lever is in a normal position and which provides indications of overweight or underweight according as the associated end of the second lever is below or above said normal position, each of said mechanisms exerting on the associated end of said second lever upwardly directed force which varies in magnitude in accordance with downward movement of the associated end of said second lever, said mechanisms being arranged so that the upwardly directed force exerted thereby on the second lever is substantially less than the downwardly directed force exerted on the second lever by an article being weighed, and a counterweight attached to said first lever on the second side of said first axis, said counterweight being of such size and location that it substantially offsets the weight of the portion of said first lever on the first side of said axis together with the weight of said second lever and the portion of the force exerted on the second lever by an article being weighed in excess of the force exerted on said second lever by said balancing pendulums and balance indicating mechanisms, said counterweight being of such size and location that when there is mounted on said second lever an article of standard weight the first lever is held in such a position that said second axis is located in substantially the same horizontal plane as said first axis.

6. In a device of the class described, a main lever pivotally supported for movement about a first axis, a second lever pivotally supported intermediate its ends on said main lever for movement about a second axis spaced from and extending substantially parallel to said first axis, means on said second lever for holding a connecting rod to be weighed in a substantially predetermined position with the crankshaft end thereof at the first side of said second axis and the piston pin end thereof at the second side of said second axis, a first counterweight attached to said second lever on the second side of said second axis and arranged to substantially equalize the forces exerted on the portions of said second lever on opposite sides of said second axis when there is supported on said second lever a connecting rod having the standard distribution of weight between its two ends, each end of said second lever having connected thereto a balancing pendulum and balance indicating mechanism which exert on the ends of the second lever upwardly directed force of substantially smaller magnitude than the downwardly directed force exerted on the lever ends by a connecting rod supported on the lever, the magnitude of the force exerted by each of said mechanisms increasing in accordance with downward movement of the associated end of said second lever, and a second counterweight associated with said first lever, said second counterweight being located on the side of said first axis opposite from that on which said second axis is located and being of such size and location that it substantially offsets the weight of the portion of said first lever on the side of said first axis opposite from that on which said second counterweight is located together with the weight of said second lever and the portion of the force exerted on said second lever by a connecting rod being weighed in excess of the force exerted on said second lever by said balancing pendulums and balance indicating mechanisms.

7. In a device of the class described, a main lever supported for movement about a first axis, a generally horizontally extending second lever pivotally supported intermediate its end on said main lever for movement about a second axis spaced horizontally from and extending substantially parallel to said first axis, means on said second lever for supporting an elongated article to be weighed in a substantially predetermined position relative to said second axis and with the ends of said article on horizontally opposite sides of said second axis, each end of said second lever having connected thereto a balancing pendulum and balance indicating mechanism which exert on the ends of said second lever upwardly directed force of substantially smaller magnitude than the downwardly directed force exerted on the lever ends by an article supported on the lever, the magnitude of the force exerted by each of said mechanisms increasing in accordance with downward movement of the associated end of said second lever, and means adjustably mounted on said main and second levers for causing a condition of balance of said device when such an elongated article is supported on said second lever.

WILLIAM G. MARTIN.

REFERENCES CITED

The following references are of record in the file of this patent:

UNITED STATES PATENTS

| Number | Name | Date |
| --- | --- | --- |
| 557,140 | Munson | Mar. 31, 1896 |
| 1,647,923 | Lundgren | Nov. 1, 1927 |
| 2,282,052 | Hem | May 5, 1942 |